United States Patent [19]
Inoue

[11] Patent Number: 5,125,484
[45] Date of Patent: Jun. 30, 1992

[54] DRUM BRAKE

[75] Inventor: Takashi Inoue, Saitama, Japan

[73] Assignee: Akebono Brake Industry Co., Ltd., Tokyo, Japan

[21] Appl. No.: 596,236

[22] Filed: Oct. 12, 1990

[30] Foreign Application Priority Data

Nov. 7, 1989 [JP] Japan ................................ 1129334

[51] Int. Cl.⁵ ............................................. F16D 51/00
[52] U.S. Cl. .................. 188/327; 188/79.54; 188/79.55; 403/14
[58] Field of Search .............. 188/79.51, 79.52, 79.53, 188/79.54, 79.55, 79.56, 79.59, 79.61, 79.62, 196 BA, 327; 192/111 A, 75, 76; 267/179; 403/14, 199

[56] References Cited

U.S. PATENT DOCUMENTS

| | | | |
|---|---|---|---|
| 4,101,011 | 7/1978 | Burnett | 188/79.56 |
| 4,220,227 | 9/1980 | Kluger | 188/79.56 |
| 4,502,573 | 3/1985 | Carvé | 188/79.63 |

FOREIGN PATENT DOCUMENTS 2075140 11/1981 United Kingdom .

*Primary Examiner*—Matthew C. Graham
*Assistant Examiner*—Chris Schwartz
*Attorney, Agent, or Firm*—Cushman, Darby & Cushman

[57] ABSTRACT

An improved drum brake includes a brake drum rotating along with a wheel, a backing plate provided to a stationary portion of a vehicle, a pair of brake shoes that are movably supported on the backing plate and a wheel cylinder attached to the backing plate. The wheel cylinder is adapted to expand the brake shoes to an operating position whereby friction linings attached to the brake shoes are frictionally engaged with an inner peripheral surface of the brake drum. An adjustable strut is disposed between the brake shoes to maintain the spacing therebetween and a return spring is provided adjacent the strut for retracting the brake shoes away from the inner peripheral surface of the brake drum. An end portion of the strut is provided with a bend portion parallel to a web of one of the brake shoes, the bend portion being sandwiched between the web of the brake shoe and an end of the return spring.

5 Claims, 2 Drawing Sheets

DRUM BRAKE

BACKGROUND OF THE INVENTION

1. Field of the Invention

This invention relates to an improved drum brake device used for braking a vehicle. The invention provides an inexpensive mechanism for preventing an interference between a shoe return spring and an adjustable strut which maintains the spacing between a pair of brake shoes.

2. Description of the Related Art

FIG. 5 (Prior Art) shows a conventional drum brake for braking a vehicle. The conventional drum brake comprises: a brake drum (not shown) which rotates along with a wheel; a backing plate 1 fixed on a suspension device; a pair of brake shoes 3a and 3b which are movably supported by the backing plate 1, the brake shoes being allowed to move pivotally about an anchor 2 fixed to one end of the backing plate 1 (lower end as viewed in FIG. 5); a wheel cylinder 5 fixed to the other end of the backing plate 1 (upper end as viewed in FIG. 5), the wheel cylinder 5 being adapted to expand the pair of brake shoes 3a and 3b to an operating position whereby friction linings 4 attached to the brake shoes 3a and 3b are frictionally engaged with the inner peripheral surface of the brake drum when pressurized fluid is supplied to the wheel cylinder; an adjustable strut 7 disposed between the brake shoes 3a and 3b to maintain the spacing therebetween; and a return spring 6 provided adjacent the strut 7 for retracting the brake shoes 3a and 3b from the brake drum.

The strut 7 can freely extend or shorten its length by means of a screw device provided therein which is operated by rotation of an adjuster gear 11 provided in a middle portion of the strut 7. In addition, both ends of the strut are respectively pressed flat and are formed substantially bifurcate-shaped in section. One end portion of the strut 7 (left end as viewed in FIG. 5) holds both sides of a web 9a of the brake shoe 3a (left side as viewed in FIG. 5). One end portion of a parking lever 8 is pivotally supported by a pin 10 provided at one end of a web 9b of the other brake shoe 3b (right side as viewed in FIG. 5). The other end portion of the strut 7 holds a middle portion of the parking lever 8.

Further, the parking lever 8 and one end of an L-shaped adjuster lever 12 are pivotally supported by the pin 10. A middle portion of the adjuster lever 12 is engaged with the end portion of the strut 7 and a pawl portion 12a provided on the other end portion of the adjuster lever 12 is engaged with the adjuster gear 11 in such a manner that the adjuster gear 11 can be rotated by the pawl portion 12a. With respect to the return spring 6, one end portion thereof is abutted against the web 9a and the other end thereof is abutted against the middle portion of the adjuster lever 12 located between the pin 10 and the engaging portion of the strut 7, whereby the return spring 6 has two functions. The first function is to allow the adjuster lever 12 to rotate pivotally around the pin 10 when the braking force is operated, and the second function is to retract the pair of brake shoes 3a and 3b to their original position when the braking force is released. A drum brake device of this type is disclosed in detail in U.S. Pat. No. 4,101,011.

When the braking force is operated by the drum brake thus constructed, the single ends of the pair of brake shoes 3a and 3b (upper end as viewed in FIG. 5) are expanded away from each other by the wheel cylinder 5 fixed to the backing plate 1. Both brake shoes 3a and 3b are displaced toward the outside of the backing plate 1, pivoting around the anchor 2. The outer peripheral surfaces of the friction linings 4 of the brake shoes 3a and 3b are frictionally engaged with the inner peripheral surfaces of the brake drum, thereby causing a braking force to be produced by the friction between these surfaces. When the supply of pressurized fluid to the wheel cylinder 5 is interrupted, the brake shoes 3a and 3b are retracted to their original position by the return spring 6, thereby disengaging the outer peripheral surfaces of the friction linings 4 from the inner peripheral surfaces of tho brake drum.

When the parking brake is operated, the other end (lower end as viewed in FIG. 5) of the parking lever 8 is pulled toward the left in FIG. 5 by a cable (not shown), thereby causing the parking lever 8 to pivot clockwise around the pin 10 as viewed in FIG. 5. Since one end of the strut 7 abuts against the middle of the parking lever 8, this causes the strut 7 to be pushed toward the left as viewed in FIG. 5, thereby pushing the brake shoe 3a against which the other end of the strut 7 abuts, outward. Thus, the outer peripheral surface of the brake lining 4 of the brake shoe 3a is pushed against the inner peripheral surface of the brake drum. Simultaneously, as a reaction, the pin 10 supporting one end of the parking lever 8 is displaced outwardly, thereby pushing the brake shoe 3b to which the pin 10 is attached, outwardly. This pushes the outer peripheral surface of the friction lining 4 of the brake shoe 3b against the inner peripheral surface of the brake drum.

As a result, the outer peripheral surfaces of the linings 4 of both brake shoes 3a and 3b are pressed against the inner peripheral surface of the brake drum so that a braking force is obtained by the friction between the surfaces.

As the linings 4 are worn by repeated braking, the gap between the outer peripheral surfaces of the linings 4 and the inner peripheral surface of the brake drum is maintained within a prescribed range by causing the adjuster gear 11 provided on the strut 7 to rotate by the pawl portion 12a of the adjuster lever 12, thereby expanding the strut 7.

In a drum brake thus constructed and operated, it is inevitable that the return spring 6 and the strut 7 will interfere with each other, as best seen in FIG. 8 (prior art) because there is not enough room therebetween. For this reason, if any measures to meet this situation are not taken, vibration and expansion and contraction of the return spring 6 corresponding to braking will cause the return spring 6 and strut 7 to rub against each other, resulting in interfered operation of the components, undesirable noise and driver discomfort.

Therefore, the conventional drum brake is constructed as shown in FIGS. 6 (Prior Art) and 7 (Prior Art) so that interference between the return spring 6 and strut 7 can be prevented. In other words, in a drum brake as shown in FIG. 6 (Prior Art), an outer diameter of the return spring 6 is formed thick at its end portions and thin at its middle portion, thereby preventing the middle portions of the return spring 6 and the middle portion of the strut 7 from interfering with each other. This prevents undesirable sound from occurring regardless of vibration or operation of the drum brake.

In a drum brake as shown in FIG. 7 (Prior Art), a spacer 13 is held between the end of the return spring 6 and the web 9a of the brake shoe 3a, thereby preventing the middle portion of the return spring 6 and the strut 7 from interfering with each other.

However, the conventional drum brakes described above are troublesome and expensive to manufacture because of having to form only the end portions of the spring 6 thick. It is also difficult to provide and hold the spacer between the end portion of the return spring 6 and the web 9a.

SUMMARY OF THE INVENTION

The drum brake according to the present invention which overcomes the above-described shortcomings comprises: a brake drum rotating along with a wheel; a backing plate attached to a stationary portion of a vehicle; a pair of brake shoes that are movably supported on the backing plate; a wheel cylinder fixed to the backing plate, the wheel cylinder expanding the brake shoes to an operating position whereby friction linings attached to the brake shoes are frictionally engaged with an inner peripheral surface of the brake drum; an adjustable strut disposed between the brake shoes to maintain the spacing therebetween; and a return spring adjacent the strut for retracting the brake shoes from the inner peripheral surface of the brake drum.

Further, with respect to the present invention, an end portion of the strut is provided with a bend portion that is parallel to a web of the brake shoe, the bend portion being sandwiched between the web of the brake shoe and an end of the return spring.

In the present drum brake thus constructed and operated, there is no need for a complicated return spring because an interference between the strut and the return spring is prevented by sandwiching the bend portion of the strut between the web of brake shoe and the end of return spring.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DETAILED DESCRIPTION OF THE PREFERRED EXEMPLARY EMBODIMENTS

Figure 5:
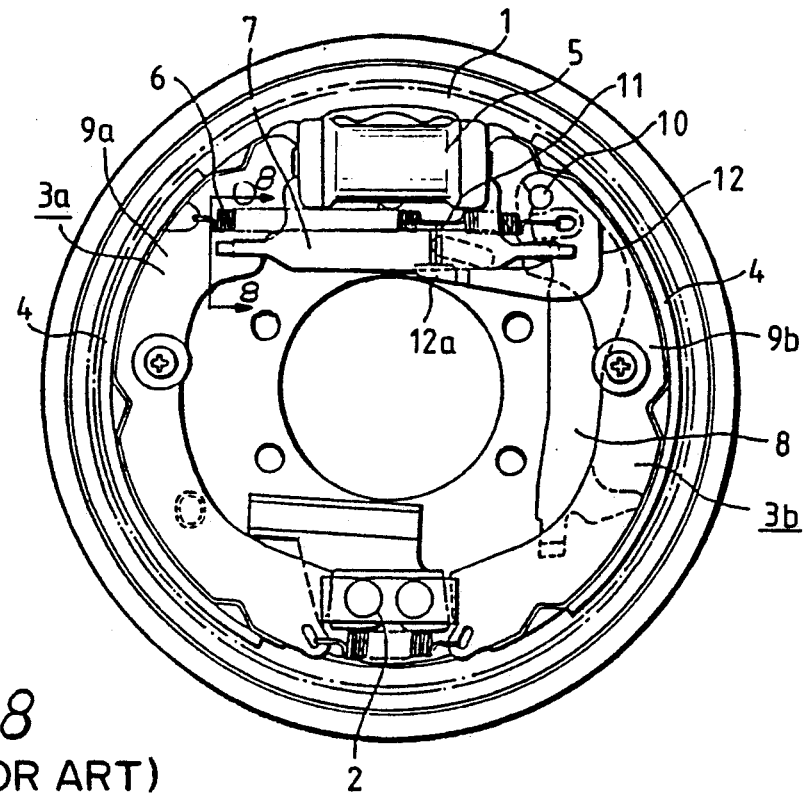
FIG. 5 (Prior Art) is a front view of a conventional drum brake to which the present invention can be applied.
Figure 8:
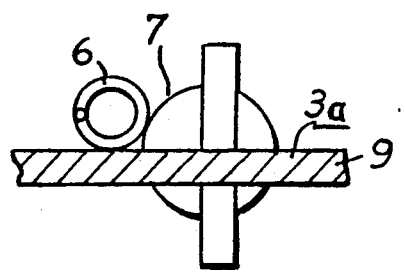
FIG. 8 (prior art) is a sectional view taken along line 8—8 in FIG. 5 showing an interference between the return spring and the strut.
Figure 6:
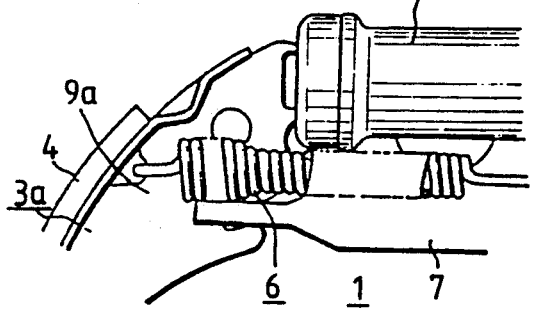
FIG. 6 (Prior Art) is an enlarged view of the area B in FIG. 5 showing a first example of a conventional drum brake.
Figure 7:
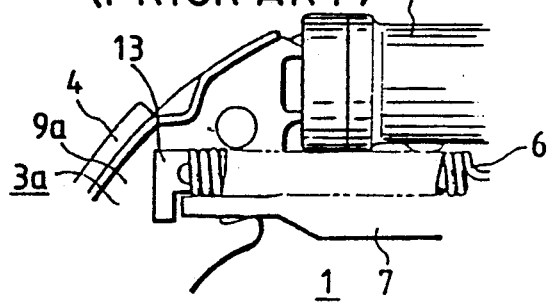
FIG. 7 (Prior Art) is an enlarged view of the area B in FIG. 5 showing a second example of a conventional drum brake.

A drum brake according to the present invention comprises, similarly to the conventional drum brake shown in FIG. 5 (Prior Art): a brake drum that rotates along with a wheel (not shown); a backing plate 1 fixed to a suspension device, the backing plate not being allowed to rotate; a pair of brake shoes 3a and 3b which are movably supported on the backing plate 1, the brake shoes being allowed to move pivotally about an anchor 2 fixed to one end of the backing plate 1; a wheel cylinder 5 fixed to the other end of the backing plate 1, the wheel cylinder 5 being adapted to expand the pair of brake shoes 3a and 3b to their operating positions whereby friction linings 4 attached to the brake shoes are frictionally engaged with the inner peripheral surface of the brake drum; an adjustable strut 7 between the brake shoes 3a and 3b; and a return spring 6 adjacent the strut 7 for retracting the brake shoes 3a and 3b away from the inner peripheral surface of the brake drum.

Figure 1:
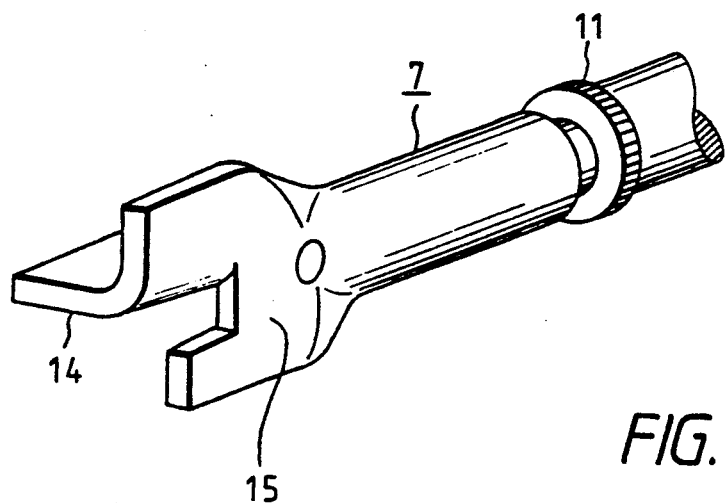
FIG. 1 is a perspective view showing the end portion of the strut according to the present invention.
Figure 2:
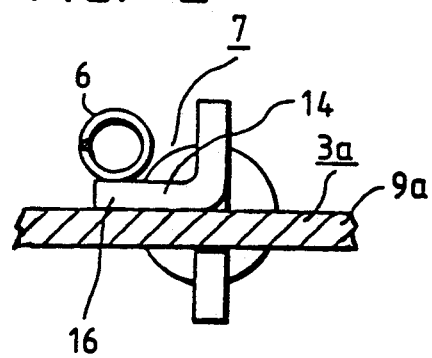
FIG. 2 is a sectional view of the present invention similar to a sectional view taken along line 8—8 in FIG. 5.
Figure 3:
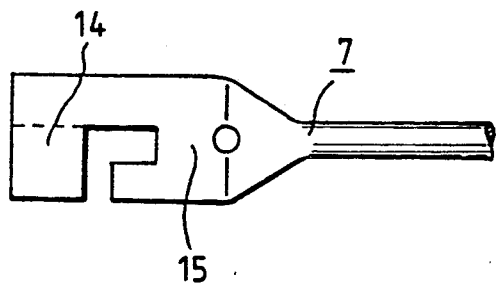
FIGS. 3 and 4 are sectional side views taken from the right side in FIG. 2 showing how the bend portion of the strut is manufactured.
Figure 4:
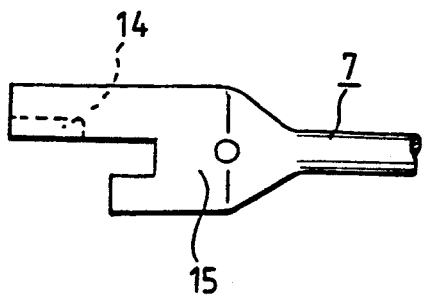

The strut 7 includes a bifurcated portion 15 which is pressed flat and formed bifurcate-shaped in section. A bend portion 14 is continuously provided to the bifurcated portion 15 so as to be substantially perpendicular to each other. As shown in FIG. 2, the bend portion 14 is sandwiched between a web 9a of the brake shoe 3a and an end of the return spring 6. The bend portion 14 is formed to extend away from an outer diameter of the strut 7 and is elongated to be parallel with the web of the brake shoe 3a. This elongated portion includes an extending portion 16. The end portion of the return spring 6 contacts the extending portion 16.

As a result, the return spring 6 is located on one side of the web 9a by the bend portion 14 and is spaced from the web 9a by a distance corresponding to a thickness of the bend portion 14, thereby preventing the middle portion of the return spring 6 and the strut 7 from interfering with each other. Therefore, a complicated return spring 6 is not required.

The braking operation and the maintaining of the gap between the outer peripheral surfaces of the linings 4 and the inner peripheral surface of the brake drum within a prescribed range are similar to that of the conventional drum brake.

In a conventional drum brake, when the adjuster gear 11 is rotated by the pawl portion 12a of the adjuster lever 12, the entire strut 7 is rotated or rolled about its axis due to friction in the screw device of the strut 7. This causes an invalid rotation of the adjuster lever 12 in accordance with its rolling movement and prevents a precise adjustment of the gap.

However, with respect to the drum brake of the present invention, the bend portion 14 is sandwiched between the web 9a and the end of the return spring 6, preventing the strut 7 from rolling when the adjuster gear is rotated by the pawl 12a of the adjuster lever 12. Therefore, the present invention facilitates a more precise adjustment of the gap.

In the present drum brake thus constructed and operated, manufacturing time and expense are reduced while still preventing interference between the return spring and the strut.

While the invention has been described in accordance with what is presently conceived to be the most practical and preferred embodiment, it s to be understood that the invention is not to be limited to the disclosed embodiment but on the contrary, is intended to cover various modifications and equivalent arrangements included within the spirit and the scope of the appended claims, which scope is to be accorded the broadest interpretation of such claims so as to encompass all such equivalent structures.

What is claimed is:

1. A drum brake comprising:
   a brake drum rotatable along with a wheel;
   a backing plate attached to a stationary portion of a vehicle;
   a pair of brake shoes movably supported on the backing plate, the brake shoes including friction linings;
   a wheel cylinder attached to the backing plate, the wheel cylinder adapted to expand the brake shoes to an operating position whereby the friction linings are frictionally engaged with an inner peripheral surface of the brake drum;
   an adjustable strut disposed between the brake shoes to maintain a spacing between the brake shoes, the strut having a bend portion on one end, a portion of which is parallel with a web of one of the brake shoes; and
   a return spring attached between both brake shoes adjacent the strut for retracting the brake shoes away from the inner peripheral surface of said brake drum, the bend portion of the strut being sandwiched between the web of the brake shoe and a coil end portion of the return spring to position the return spring away from a body of the strut.

2. The drum brake according to claim 1, wherein the bend portion includes an extending portion extending away from an outer diameter of the strut, the extending portion being formed to be parallel with the web of the brake shoe, the end portion of the return spring contacting the extending portion.

3. The drum brake according to claim 1, wherein the strut includes a flat bifurcated portion, the bend portion being continuously attached to the bifurcated portion.

4. The drum brake according to claim 3, wherein the bend portion is perpendicular to the bifurcated portion.

5. A drum brake comprising:
   a brake drum rotatable along with a wheel;
   a backing plate attached to a stationary portion of a vehicle;
   a pair of brake shoes movably supported on the backing plate, the brake shoes including friction linings;
   a wheel cylinder attached to the backing plate, the wheel cylinder adapted to expand the brake shoes to an operating position whereby the friction linings are frictionally engaged with an inner peripheral surface of the brake drum;
   an adjustable strut disposed between the brake shoes to maintain a spacing between the brake shoes, the strut having a bend portion on one end, a portion of which is parallel with a web of one of the brake shoes, the strut including a flat bifurcated portion, the bend portion being continuously attached to the bifurcated portion, the bend portion being perpendicular to the bifurcated portion; and
   a return spring adjacent the strut for retracting the brake shoes away from the inner peripheral surface of said brake drum, the bend portion of the strut being sandwiched between the web of the brake shoe and an end portion of the return spring.

* * * * *